United States Patent [19]

Land

[11] Patent Number: 5,193,869
[45] Date of Patent: Mar. 16, 1993

[54] BODY SIDE PROTECTOR FOR AN AUTOMOBILE

[76] Inventor: John F. Land, Rte. 5, Box 104, Neosho, Mo. 64850

[21] Appl. No.: 899,089

[22] Filed: Jun. 15, 1992

[51] Int. Cl.⁵ ............................................. B60R 19/42
[52] U.S. Cl. ................................... 293/128; 293/118; 280/770
[58] Field of Search ............... 293/118, 128; 280/770, 280/166, 164.1

[56] References Cited

U.S. PATENT DOCUMENTS

| | | | |
|---|---|---|---|
| 2,179,163 | 11/1939 | Roth | 293/118 X |
| 2,512,527 | 6/1950 | Hoffman | 293/128 X |
| 2,678,232 | 5/1954 | Barry | 293/118 X |
| 3,563,594 | 2/1971 | London | 293/64 |
| 4,217,715 | 8/1980 | Bryan, Jr. | 40/591 |
| 4,221,410 | 9/1980 | Dawson | 293/21 |
| 4,437,697 | 3/1984 | Hinojos | 293/118 |
| 4,561,685 | 12/1985 | Fischer | 293/128 |
| 4,648,644 | 3/1987 | Swanson | 293/118 |

FOREIGN PATENT DOCUMENTS

| | | | |
|---|---|---|---|
| 520281 | 11/1974 | U.S.S.R. | 280/166 |
| 987996 | 3/1965 | United Kingdom | 293/118 |

*Primary Examiner*—Charles A. Marmor
*Assistant Examiner*—Gary C. Hoge

[57] ABSTRACT

This invention discloses an improved body protection device for a vehicle. The body protection device mounts between the front and rear fender wells by the attachment of a flexible attachment to the fender lip in each well. A "L" shaped linkage attaches to each flexible attachment with a pivotal spring retainer attached between the "L" shaped linkage and the flexible attachment linkage. Curved linkage attaches the "L" shaped linkage to a body protection bar which extends between the front and rear attached curved linkage. A stop is mounted on the "L" shaped linkage to limit the movement of the body protection bar against the side of the vehicle when in place. Various adjustments are incorporated to provide means to accommodate various vehicle dimensions.

9 Claims, 1 Drawing Sheet

BODY SIDE PROTECTOR FOR AN AUTOMOBILE

BRIEF DESCRIPTION OF THE PRIOR ART

Side protectors for motor vehicles has been addressed by several inventors in the past. U.S. Pat. Nos. 2,512,527; 4,221,410; 3,563,594; 4,437,697; 4,561,685 and 4,648,644 all illustrate various ways to protect the side of a vehicle from abusive impact from an adjacent vehicle. Most of the patented disclosures attach the protection apparatus under the vehicle. Underbody attachment is dependent on an even and parallel plane for mounting the body side protector; however, vehicle under carriages are uneven due to pinch welds, exhaust routing, floor board protrusions, frame cross members, unibody construction and the like. For the mounts to be horizontally parallel and even (necessitated for an upright level appearance) the devices' mounts must be attached lower than the vehicle's undercarriages lowest point. This requirement drastically restricts ground clearance and has potential for damage to the device. Because of the low mounting points necessitated by the undercarriage configuration, the device appears as a suspended "hang-on" and is unsightly as viewed from the vehicles's side. The user must then reach under the vehicle, pull out the apparatus and lift and lock the apparatus in the proper position to protect the side of the vehicle. The only patent that is substantially different than the majority is the patent to Fischer, U.S. Pat. No. 4,561,685 that attaches the apparatus to the door by straps. None of the patents describe a body protector that is easy to use, is out of the way during travel and is inexpensive to build and easy to install.

U.S. Pat. No. 2,512,527 is limited in its protection by its swing height due to its mounting on the lower body frame of the vehicle and is very ineffective against irregularly shaped doors that protrude at the top.

BRIEF DESCRIPTION OF THE INVENTION

This invention describes a body protection device for a vehicle which attaches to each of the inner fender lips of each of the fender wells of the vehicle on the same side of the vehicle. The protector comprises a linkage attached to the front fender lip in the shape of an "L" shaped bracket. A spring is attached between the arm of the "L" shaped bracket and the fender lip. A rotating spring mount is attached to the "L" shaped bracket to toggle the bracket in an "up" or "down" position. A similar bracket is mounted to the rear fender lip. A two piece telescoping body protecting rod is attached between the front and back brackets. When the body protector is stored, the apparatus is positioned against the lower rocker panel at approximately 60 degrees. When it reaches a predetermined position, the toggle action of the spring will continue the movement to a fully retracted position under the vehicle. When it is desired to position the body protector, the reverse is done with the spring toggling the protector in the "up" position once the brackets have passed a predetermined position.

DETAILED DESCRIPTION OF THE INVENTION

Figure 3:
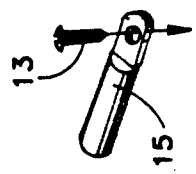
FIG. 3 is an alternate attachment piece for the body protector.
Figure 1:
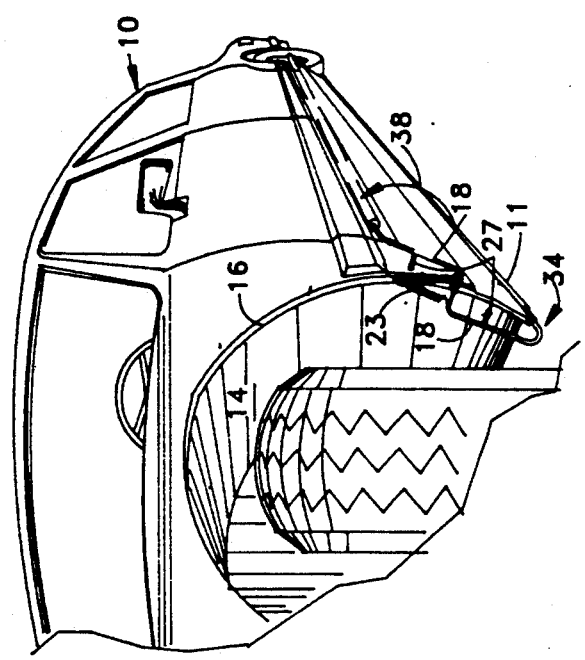
FIG. 1 is a partial perspective view of a vehicle with the body protector retracted, and extended shown in dotted lines.
Figure 2:
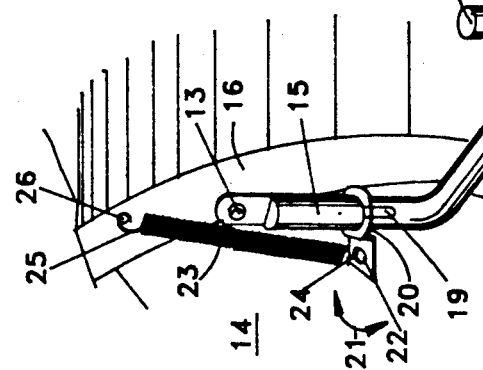
FIG. 2 is a detailed drawing of the linkage of the body protector.

Referring to all of the Figures but in particular to FIG. 1, a body protector for a vehicle 10 is illustrated which has a protection bar 11 connected to a front linkage generally referred to by arrow 12 and a rear linkage which is identical to front linkage 12 but reversed in its attachment (not illustrated). Referring to FIG. 2, linkage 12 is shown in detail. A portion of a fender well 14 has a flexible attachment 15 that is attached through a drilled hole in an inner fender lip portion 16 and secured by a bolt or screw 13 (see FIG. 3) and which may be a self threading screw or a screw and nut. Flexible attachment 15 is a strong flexible plastic such as nylon which is illustrated in FIG. 3. Flexible attachment 15 is attached to an "L" shaped linkage 18 by use of a bolt 19. Spring mounting retainer 20 is secured between flexible attachment 15 and 18 by bolt 19 and is free to rotate as indicated by arrows 21. Spring mounting retainer 20 has an opening 22 for receiving the end 24 of a spring 23. The remaining end 25 of spring 23 is secured by an attachment 26 which is bolted through fender portion 14. A stop extension 27 is welded, bent or attached at 28 to "L" shaped bracket 18 and extends normal to the surface of bracket 18. A padded end 29 covers stop extension 27 with a rubber cap or any other padded material that will not mar the paint or surface coating of the vehicle. It should be understood that the main purpose of stop 27 and pad 29 is to limit the movement of bar 11 against the side of vehicle 10. A much thicker pad over bar 11 could accomplish the same result as stop 27 and pad 29, for example. A curved linkage 30 is attached to "L" shaped bracket 18 through an adjustment bolt 31. In the preferred embodiment, bolt 31 has mating threads in linkage 18. It is obvious that any adjustment means can be incorporated and still be within the spirit and scope of this invention. For example, an adjustment could incorporate mating holes in curved bracket 30 and "L" shaped bracket 18 with a pin securing each. A plurality of mating holes would provide the necessary adjustments to accommodate various vehicle configurations. Bar 11 is attached to curved bracket 30 by any usual means such as a pin 33.

Figure 4:
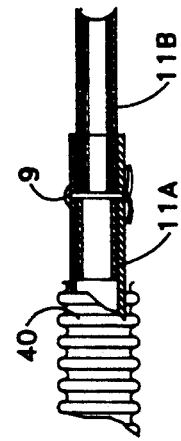
FIG. 4 is a partial cross-section of a portion of the body protecting rod.

The rear assembly is identical to that described for the front assembly with the exception that the parts are mounted in a "mirror" fashion. To accomplish the above, flexible attachment 15 is simply rotated 90 degrees so that flexible attachment 15 is facing in the opposite direction. Spring 23 and spring retainer 20 are likewise rotated 90 degrees. "L" shaped bracket 18 remains positioned as illustrated and curved bracket 30 is rotated 90 degrees. Body protection bar 11 has been illustrated as being one piece. Referring to FIG. 4, the preferred embodiment is illustrated as being a telescoping rod comprising portions 11a and 11b. A pin 9 passes through preformed holes or openings in rod portion 11b so that the length of rod 11a and 11b can be adjusted for various width mounting requirements for body protector bar 11. It is obvious that it can be fabricated from several pieces. Further more, the various differences in dimensions between the fender wells of various vehicles can be easily accommodated by providing adjustments of the length of body protection bar 11 by providing telescoping tubes, as described.

OPERATION

The novel body protector is attached to a vehicle very easily. Flexible attachments 15 is attached by self taping screws as shown in FIG. 3, or attached using a screw and bolt through the inner fender lip on the front of the vehicle. The spring is then attached using a self taping screw or bolt and nut through the inner fender lip as illustrated in FIG. 2. The telescoping body protecting rod 11 is then extended so that flexible attachment 15 and spring 23 are attached to the rear fender lip the same as the front attachments were made. The telescoping rod is then pinned by pin 9 (see FIG. 4) to secure the length of rod 11. The installation is complete and takes only a few minutes. The body protector operates in the following manner.

With reference to FIG. 1, the body protector is illustrated in a stowed position as indicated by arrow 34. In this position spring 23 is pulling up on "L" shaped portion 18, retaining body protector rod 11 in position under the vehicle. When the body protector 11 is moved in an upward position as indicated by arrow 38, "L" shaped bracket 18 pivots about attachment screw 13 with spring 23 pulling up on "L" shaped bracket 18 keeping rod 11 in position in the "up" position. Springs in both ends of rod 11 are pulling up in order to keep the rod 11 in proper position. When the body protection bar 11 is in the "up" position stop extension 27 with its cap 29 will strike the side of the vehicle stop in the upward movement of bar 11. Spring retainer 20 is free to rotate about screw 19 permitting spring 23 to shift the attachment for spring 23 from one side of bracket 18 to the other side of bracket 18. This action permits proper anchoring of the body protector bar 11 in both the "up" position and the "stow" position. When in the "up" position, the body protection bar 11 is in position to prevent damage to the side of vehicle 10 due to impact from adjacent vehicles opening their doors and the like.

Several adjustments permit the accommodation of the body protector for various vehicles. Curved bracket 30 can be lengthened by rotating same about nut 32 in a manner to lengthen bolt 31 exposure. In addition, body protection bar 11 can be adjusted in its length to accommodate various mounting distances between vehicle fender wells. In the preferred model, body protection bar 11 is covered with a rubber or plastic material to protect the surface of the vehicle. It is obvious that other coverings can be used such as toroidal rings spaced along bar 11, for example. If it is desired to provide simultaneous movement of bar 11 on both sides of the vehicle, then cables can be connected to each of the linkages and under the vehicle so that movement of one bar 11 will cause the other to move in a corresponding manner. It is also obvious that other systems such as electrical or hydraulic could be substituted for a mechanical linkage or cable above described.

CONCLUSION

A novel body protection device for a vehicle has been disclosed that can accommodate various makes of vehicles. The body protector can be mounted by merely drilling four holes to mount the flexible attachment and spring anchor in each fender lip. The body protector is easy to use and stores in a manner that will not be unsightly when not in use. It is obvious that changes and modifications can be made in the invention as disclosed and still be well within the spirit and scope of the invention as disclosed in the specification and appended claims.

What I claim is:

1. A side protection device for a vehicle having a front and rear fender well and an under carriage and side panel means, said side protection device comprising:
   a. first and second linkage means each having a first and second end;
   b. first and second flexible attachment means for attachment at one end to said first end of said first and second linkage means and means at its remaining end for attachment to said front and rear fender well lips respectively;
   c. first and second spring means including means for securing said spring means to each of said front and rear fender well lips respectively and first and second pivotal retainer means for securing each of said spring means to its respective first and second linkage means;
   d. first and second curved linkage means secured at one end to said second end of said first and second linkage means respectively; and,
   e. bar means for connecting each of said first and second curved linkage means together;
   whereby said spring means will toggle said linkage means and said bar to a position under said vehicle in the "down" or stored position and will toggle said linkage means in the "up" or used position when said bar is in the protection position for said side panel means.

2. An apparatus as claimed in claim 1 wherein said first and second linkage means includes first and second stop means attached to said first and second linkage means respectively in a position to strike said side panel means when said side protection device is positioned to protect said side panel means;

3. An apparatus as claimed in claim 1 wherein said first and second linkage means each includes a first portion connected to said pivotal means, and an "L" shaped portion having one end connected to said first portion and a second end connected to said curved linkage means.

4. An apparatus as claimed in claim 3, wherein length adjustment means is attached between said "L" shaped portion and said curved linkage means.

5. An apparatus as claimed in claim 1 wherein said bar means is covered in a yieldable material.

6. A device as claimed in claim 3 wherein said bar means is covered with yieldable material 7. A device as claimed in claim 3 wherein said bar means is extendable.

8. A linkage for a side protection device for a vehicle having at least a fender well comprising:
   a. a linkage means having a first and second end;
   b. a flexible attachment means having a pivotal means at one end for attachment to said first end of said linkage means and means at its remaining end for rigid attachment to said fender well;
   c. spring means including means for securing said spring means to said fender well and pivotal retainer means for securing said spring means to its respective linkage means;
   d. curved linkage means secured at one end to said second end of said linkage means; and,
   e. means at the remaining end of said curved linkage means for attachment to said bar means.

9. Apparatus as claimed in claim 1 wherein said flexible attachment means is a bar of flexible plastic having an extension for attachment to said fender lip.

* * * * *